United States Patent

Sedutto et al.

[11] Patent Number: 4,762,232
[45] Date of Patent: Aug. 9, 1988

[54] FROZEN CONFECTION CONTAINER AND METHOD

[75] Inventors: Anthony J. Sedutto, Staten Island; Stephen L. Capece, Beechhurst, both of N.Y.

[73] Assignee: The Pillsbury Co., Minneapolis, Minn.

[21] Appl. No.: 921,724

[22] Filed: Oct. 21, 1986

[51] Int. Cl.⁴ .............................................. B65D 6/02
[52] U.S. Cl. ................................. 206/525; 426/515; 426/383
[58] Field of Search ............... 206/525, 508; 426/383, 426/515, 414, 393, 87, 130; 249/52, 121, 126

[56] References Cited

U.S. PATENT DOCUMENTS

| Re. 28,720 | 2/1976 | Sedalk | 206/508 X |
| 268,544 | 12/1882 | Rusling | 206/525 X |
| 321,857 | 7/1885 | Schuette | 249/52 X |
| 1,446,782 | 2/1923 | Broun et al. | 206/525 X |
| 1,903,212 | 3/1933 | Frost | 206/525 X |
| 1,978,296 | 10/1934 | Donovan et al. | 206/525 X |
| 2,235,964 | 3/1941 | Meyer et al. | 426/515 X |
| 2,444,861 | 7/1948 | Symmes | 206/525 X |
| 2,520,522 | 8/1950 | Adams | 426/383 X |
| 2,961,850 | 11/1960 | Tupper | 249/126 |
| 3,337,077 | 8/1967 | Wheaton, Jr. | 206/525 X |
| 4,061,241 | 12/1977 | Retelny | 206/508 X |
| 4,388,334 | 6/1983 | Deveaux | 426/515 X |

FOREIGN PATENT DOCUMENTS

| 776577 | 10/1934 | France | 426/383 |
| 45-11103 | 4/1970 | Japan | 426/515 |
| 2139337 | 10/1984 | United Kingdom | 426/515 |

Primary Examiner—Joseph Man-Fu Moy

[57] ABSTRACT

A two-piece container for a layered frozen confection including top cover and bottom members with the cover having radial ribs specifically designed to provide marking indicia in the top surface of the confection after the cover is removed, said ribs also extending above the top cover surface to provide supporting ribs for a container stacked thereon; also a method of making a layered frozen confection and providing division indicia ribs on the top surface of the confection.

5 Claims, 1 Drawing Sheet

FROZEN CONFECTION CONTAINER AND METHOD

SUMMARY OF THE INVENTION

A two-member container for a layered frozen confection including a bottom member and a domed cover member provided with a plurality of portion defining ribs formed in the top portion of the cover member to define a planar support for the bottom of a container stacked thereon and also produce division marking indicia on the top surface of the confection confined under the dome cavity; and method steps for initially making and thereafter serving in pre-indicated portions, a layered frozen confection product such as a layered ice cream pie, said method consisting in filling to a predetermined level the bottom container member with the ingredients for the bottom layer and also filling to predetermined level an inverted domed cover member with ingredients having sufficient viscosity and cohesiveness to permit the filled cover member to be turned over onto the filled bottom member, assembling the cover with ingredients therein on the filled bottom container member, storing the filled assembled container members in a frozen storage facility, providing marking indicia on the inside of the cover member, defining embossed portion defining indicia on the top surface of the upper layer, warming the outside of the filled cover member assembled on the filled bottom container, and removing the cover to expose the indicia and the top of the pie confection, and cutting the pie confection along the embossed indicia to divide the confection into the desired predetermined serving portions

DETAILED DESCRIPTION OF THE PREFERRED EMBODIMENT

Figure 1:
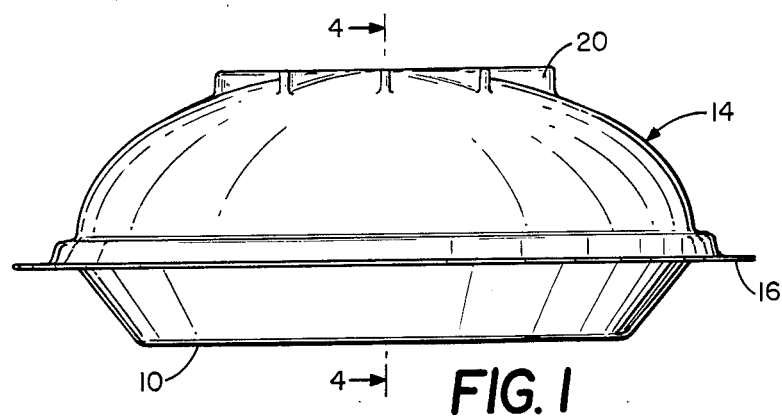
FIG. 1 is a front elevational view showing an assembled container embodying this invention.
Figures 2, 3:
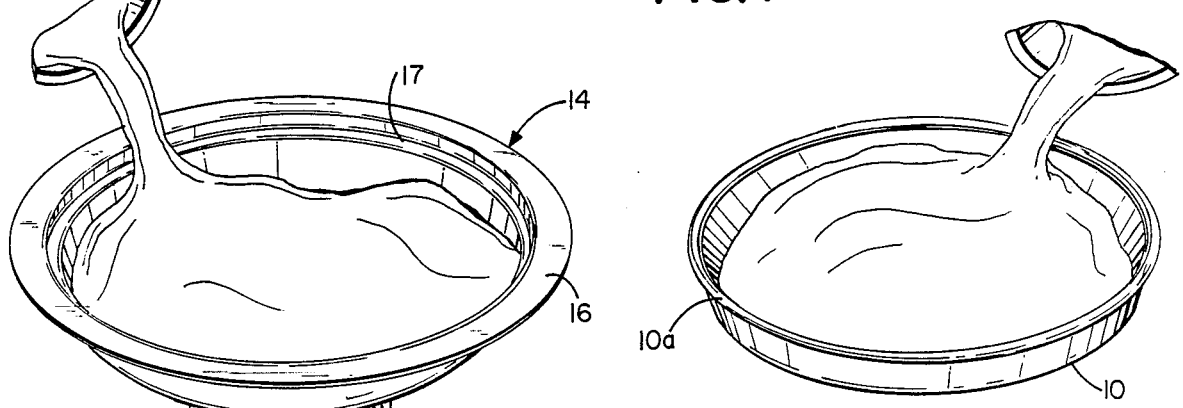
FIG. 2 is a perspective view of bottom member being filled.
FIG. 3 is a perspective view of the cover member being filled.

A preferred embodiment is illustrated in FIGS. 1-6 of the drawings. A bottom container member 10 is provided which in the prefered form, has a rolled top peripheral bead 10a and can be a conventional light weight formed aluminum pan. A domed cover member 14 is provided which has dome portion 15, a peripheral flange 16 and a bead-receiving groove 17. The upper portion of the dome portion 15 is provided with a plurality of divider ribs 20 which are preferably raised and hollow and extend radially outwardly from the center portion thereof a distance sufficient for stable stacking preferably approximately one-half the radius of the raised dome portion 15. More than two ribs 20 may be provided and the top edge portions of the raised ribs 20 define a planar surface to permit stacking of assembled container units one on top of the other. Any suitible number of ribs can be provided and typically would be 6-12. Each of the ribs 20 preferably is hollow to form inner recesses 20a on the inside with the width of each recess being approximately ⅛ inch which has proved to be sufficient to permit the soft ice cream product poured into the cover dome 15, to flow into the open rib cavities 20a and form raised portion divider indicia ribs 22a on the top surface of the product when the cover is removed from the frozen product. It is to be understood that the ribs 20 can also project inwardly, as well as outwardly, into the dome to form the divider indicia.

The cover 14 with hollow ribs 20 can be conveniently molded from sheet plastic by a pair of mating mold sections or by being vacuum formed from plastic. Also a solid rib version can be injection molded and the members 10 and 14 are preferably imperforate.

Figure 4:
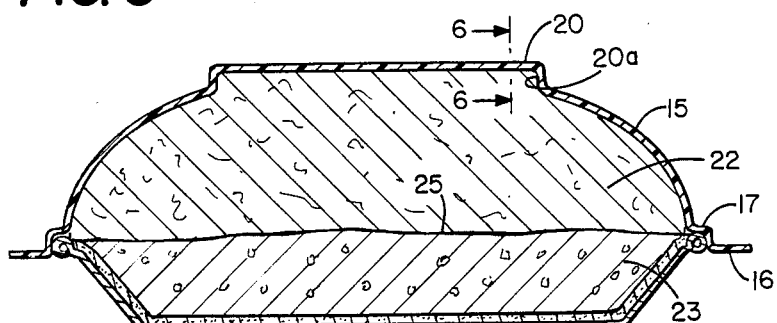
FIG. 4 is a vertical section taken substantially along the line 4—4 of FIG. 1.
Figure 6:
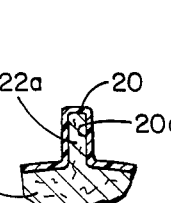
FIG. 6 is a fragmentary sectional view taken substantially along the line 6—6 of FIG. 4.

The method of manufacturing, storing and serving a layered frozen confection product includes the following steps: initially filling the two container members 10 and 14 with the respective products 22 and 23. Inverting the filled cover member 14 onto the filled bottom member 10 with the top bead 10a of the bottom member received within the groove 17 of the cover member 14, storing the assembled, filled container members in a frozen ambient, warming the cover member to release the same from the contents and expose the divider ribs 22a and the top surface of the upper layer 22, cutting the product along a vertical plane identified by each of said ribs to produce portions of the desired size. These cut pieces of the confection product can then be served and control of the size of the portions is automatically maintained The product 22 is gravity fed into the inverted top cover section 14 to the level of the bottom of the bead-receiving groove 17 and flows into the hollow ribs 20a. The cover unit 14 at room temperature causes a slight temporary melting of the product 22 so that it flows freely into the hollow ribs 20a and fills the individual rib cavities 20a. The filled cover 14 is turned over on the bottom section 10 and the upper product 22 interfaces with the lower product 23 contained within the bottom member 10 along an interface line 25 as best shown in FIG. 4. Soft ice cream product at a temperature of approximately 22 degrees fahrenheit is well adapted for use with this type of layered confection and it is sufficiently cohesive to permit the filled cover section 14 to be turned over onto the filled bottom section 10 with the bead 10a of bottom member being received in groove 17 of the cover. A pie crust 23a may be provided as a part the constituency of the bottom confection 23 as shown in FIG. 4, although this crust 23a is not essential to the inventive concept.

Figure 5:
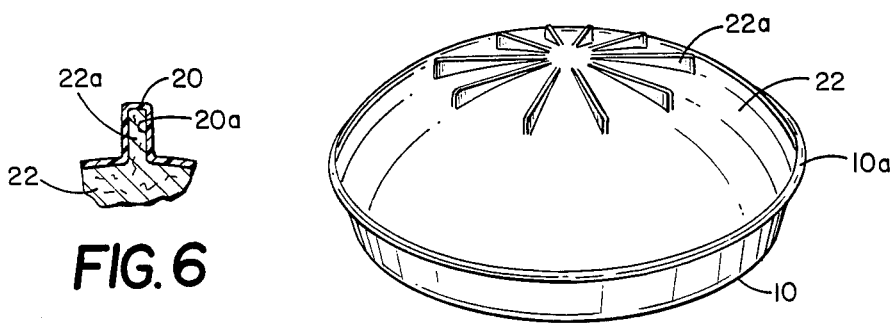
FIG. 5 is a perspective view of a pie with the cover removed showing raised portion defining indicia ribs formed thereon.

After the two container members 10 and 14 are filled and assembled they may be stacked in a storage facility at an appropriate below freezing temperature. When the product is to be served, the cover unit 14 is warmed as by running warm water thereon thus releasing the cover from the top surface of the top ingredient layer 22. This permits the cover 14 to be easily removed and the top surface of the layer 22 is thus exposed as shown in FIG. 5. The radial ribs 22a produced on the top of the upper layer 22 are then exposed and provide portion defining indicia which form cutting guides for the server. The peripheral protective flange 16 around the lower edge of the cover 14 and the close fit of the bead 10a in the groove 17 prevents water from reaching the ingredients during the warming pre-removal process.

This flange also permits the cover 14 to be firmly grasped during the separation of the cover 14 from the layered product and the bottom container member 10.

What is claimed is:

1. A two-member container for a layered frozen confection product, said container comprising:
    a bottom member having a circumferential top portion,
    a domed cover member having a dome portion and a peripheral portion around the outer circumferential edge of the dome portion,
    said peripheral portion having a diameter and being shaped to receive the top portion of the bottom member thereon and said circumferential top portion of the bottom member constitutes a bead and the peripheral portion of the domed cover member constitutes a peripheral flange having a bead receiving groove formed therein with a diameter to receive and interfit with the bead of the bottom member,
    a plurality of radially extending ribs formed in the top of the domed cover member and extend radially outwardly from a center portion of said cover member with the outside surfaces of said ribs defining a top planar support for supporting a second container thereon and said ribs define radially extending marking indicia on the inside of the domed cover member and form divider indicia in a soft confection product confined within the domed cover.

2. The structure set forth in claim 1 wherein the peripheral flange is sufficiently wide to provide both a good gripping component as well as protecting the contents of the container against contamination.

3. A cover unit for filled pie tins comprising,
    a bottom flange element,
    a groove formed around the inside of said flange to receive the outer periphery of a pie tin therein and support the cover thereon, an imperforate, protective cover portion extending upwardly from the groove to cover and protect a pie contained in a pie tin received in said groove,
    a plurality of radially extending hollow raised ribs formed in a center portion of said raised cover portion extending radially outwardly therefrom with the outside surfaces of said ribs being constructed to define a plane for supporting a second pie tin stacked thereon, said ribs providing radial cavities on the inside of the cover portion for engaging and receiving therein the top surface of a pie underlying said cover portion to provide raised guiding ribs for cutting predetermined portions of the pie after removal of the cover unit.

4. The structure set forth in claim 3 wherein the imperforate protective cover portion constitutes a generally circular dome unit having the grooved flange surrounding the lower edge thereof.

5. The structures set forth in claim 4 wherein the radially extending ribs are integrally molded into a top portion of the dome.

* * * * *